June 25, 1957 E. M. BECKER 2,796,953
SHOCK ABSORBER FOR SAFETY LINE
Filed Aug. 11, 1953
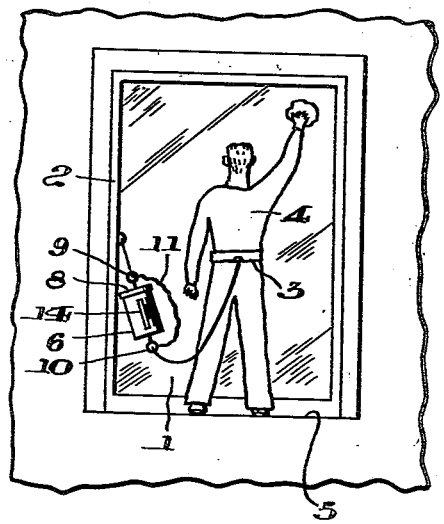
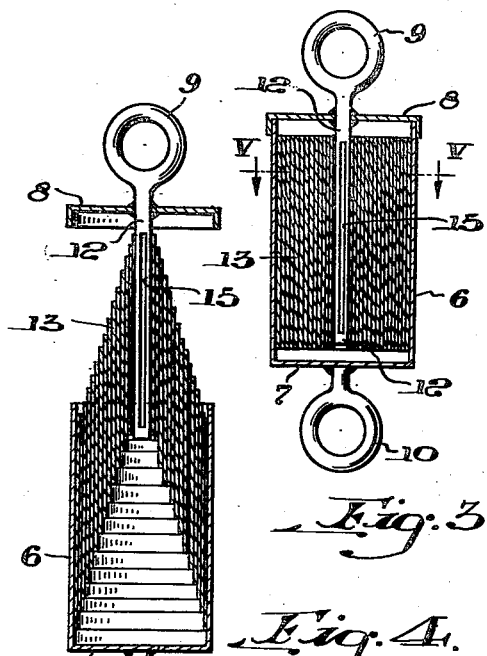
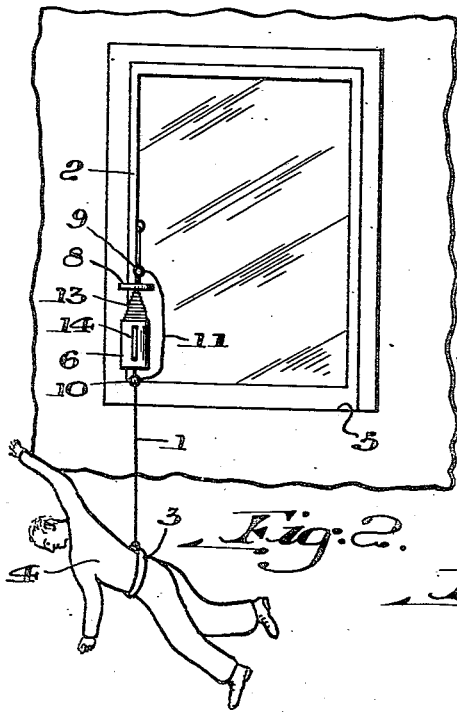
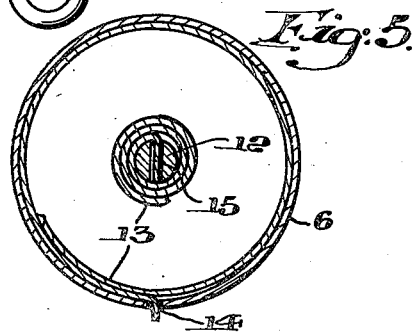
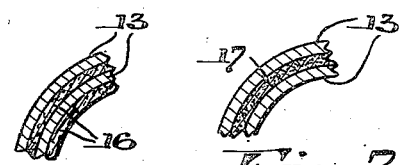
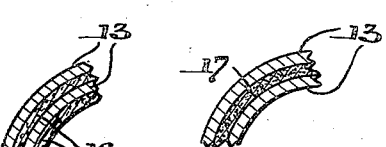
INVENTOR.
EARL M. BECKER
BY
Brown, Critchlow, Flick & Peckham
his ATTORNEYS.

2,796,953
SHOCK ABSORBER FOR SAFETY LINE

Earl M. Becker, Pittsburgh, Pa., assignor to Mine Safety Appliances Company, Pittsburgh, Pa., a corporation of Pennsylvania Application August 11, 1953, Serial No. 373,612

5 Claims. (Cl. 188—1)

This invention relates to shock absorbers for safety lines such as are used by window cleaners, steeple jacks and the like, to save them in case they fall.

Even though the fall of a man may be arrested by a safety line anchored above him to a support, the jerk that occurs when the line is pulled taut by the falling man may be so severe as to cause serious injury. Although this particular danger can be reduced by including an elastic member in the safety line to absorb some of the shock, an elastic member, such as a spring or length of rubber, has another disadvantage. That is its resiliency or recoil which will yank the man upward again and perhaps cause him to bounce up and down several times before coming to rest, knocking him against the adjacent structure in the meantime. Furthermore, elastic members do not absorb energy, but only store it temporarily and then transmit it.

It is among the objects of this invention to provide a safety line with a simple and inexpensive shock absorber that has no recoil and that will greatly decrease the shock that otherwise would occur when the safety line is pulled taut by a falling man.

In accordance with this invention a rod is loosely disposed in the center of a cylinder and extends axially out of an open end of the cylinder. Means are connected with the outer end of the rod and the opposite end of the cylinder for attaching them to a safety line at spaced points between its ends. The line may be cut for this purpose or may merely be provided with a loop. A spiral metal strip fills the cylinder around the rod and has its outer end secured to the cylinder and its inner end secured to the rod. If a man loses his footing and falls, the rod and cylinder will be pulled axially away from each other by the tension of the safety line, which will cause the convolutions of the spiral to rub against one another or a friction material between them as the spiral is elongated axially. The energy absorbed in overcoming the friction between the convolutions reduces the shock of the fall by gradually decelerating the man's body.

The preferred embodiment of the invention is illustrated in the accompanying drawings, in which Fig. 1 is a side view of my shock absorber fastened in a safety line;

Fig. 2 is a similar view showing the shock absorber after it has operated in an emergency;

Fig. 3 is an enlarged longitudinal section through the shock absorber before operation;

Fig. 4 is a similar section after operation;

Fig. 5 is a cross section taken on the line V—V of Fig. 3; and

Figs. 6 and 7 are fragmentary cross sections of modified spiral arrangements.

Referring to Fig. 1 of the drawings, a safety line 1 is shown anchored to a support, such as a window frame 2. The other end of the line it attached to the safety belt 3 of a workman 4 standing on the window ledge 5. Between the ends of the line the latter is fastened to the opposite ends of a shock absorber.

In accordance with this invention the shock absorber includes a cylinder 6 that is open at one end but preferably has its opposite end closed by an end wall 7. A removable flanged cover 8 normally closes the open end of the cylinder. Eyes 9 and 10 are securely fastened to the cover and to the opposite end wall, respectively, so that the shock absorber can be connected in the safety line. For this purpose the line can be cut and the resulting ends securely tied to the eyes. It is not necessary nor preferred to cut the line, however, for it is safer to tie the two eyes to it at spaced points, with a large loop 11 left in the line between the points of attachment. The loop should be large enough so that unless the shock absorber breaks, the loop will never be pulled taut.

Fastened securely to the center of the inside of the cylinder cover is a rod 12, as shown in Figs. 3, 4 and 5, that extends axially most of the way through the cylinder. Eye 9 forms a continuation of the rod outside of the cylinder. Wrapped around this rod and filling the place between it and the encircling cylinder wall is a spiral metal strip 13, the width of which is nearly as great as the length of the inside of the cylinder. The opposite ends of the strips are anchored to the rod and side wall of the cylinder, preferably by providing a longitudinal slot 14 in the side of the cylinder and a similar slot 15 through the rod. The opposite ends of the spiral strips are bent at more or less right angles and inserted in these slots. The bent ends of the strip may have their width reduced so that the slots will not need to be as long as otherwise would be the case.

It will be seen that if the workman loses his footing on the window ledge and falls from it, as shown in Fig. 2, great strain will be placed on the shock absorber as soon as the portions of the safety line above and below the shock absorber are pulled taut. The fall of the man will not be arrested by a severe and dangerous jerk, however, because the tension of the safety line on the shock absorber will pull the cylinder down away from its cover and thereby elongate the metal spiral 13 axially, as shown in Fig. 4. This elongation of the spiral is resisted by the sliding friction between its convolutions. The friction increases as the cylinder and cover move apart, because that twists the convolutions more tightly together. Therefore, all the time that the spiral is being elongated, it is absorbing energy to overcome the friction in the shock absorber and thereby slowing down the rate of fall of the man at the lower end of the safety line. Consequently, his body is brought to a stop in a much more gradual manner than if the shock absorber were not present. When his fall finally is stopped by the safety line, he will remain suspended in that position and not be jerked upward again, because there is no tendency for the spiral strip to telescope back into its original form as would be the case if a spring were used.

If desired, the friction between the convolutions of the spiral may be increased by winding a strip 16 of friction material between them and in engagement therewith, as shown in Fig. 6. Such a strip may be paper or some other suitable material, and its ends formed the same as those of the metal strip. It is not necessary that the friction material be in the form of a spiral strip, however, as loose granules 17 (Fig. 7), such as sand, powdered metal, etc. could space the convolutions of the metal spiral apart and increase the friction when the spiral is elongated.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A shock absorber for a safety line having an anchored end and an end attached to a man, the shock absorber comprising a cylinder provided with an open end, a rod loosely disposed in the center of the cylinder and extending axially thereof out of said open end, means connected with the outer end of the rod and the opposite end of the cylinder for attachment to a safety line at points between its ends, a spiral metal strip in the cylinder around the rod and having its outer end secured to the cylinder and its inner end secured to said rod, and friction material spacing the convolutions of said spiral apart, whereby if the rod and cylinder are pulled axially away from each other by the weight of the falling man using the shock absorber the shock of the fall will be reduced by the friction of the relatively moving convolutions of said spiral as it is elongated axially.

2. A shock absorber for a safety line having an anchored end and an end attached to a man, the shock absorber comprising a cylinder provided with an open end, a rod loosely disposed in the center of the cylinder and extending thereof out of said open end, means connected with the outer end of the rod and the opposite end of the cylinder for attachment to a safety line at points between its ends, a spiral metal strip in the cylinder around the rod, and a spiral strip of friction material wound between the convolutions of the metal spiral in engagement therewith, the outer ends of said strips being secured to the cylinder and their inner ends being secured to said rod, whereby if the rod and cylinder are pulled axially away from each other by the weight of the falling man using the shock absorber the shock of the fall will be reduced by the friction of the relatively moving convolutions of said spirals as they are elongated axially.

3. A shock absorber for a safety line having an anchored end and an end attached to a man, the shock absorber comprising a cylinder provided with an end wall and an open end, a rod loosely disposed in the center of the cylinder and extending axially thereof out of its open end, means connected with said end wall and the outer end of the rod for attachment to a safety line between its ends, the rod and the side of the cylinder each being provided with a longitudinal slot extending therethrough, and a spiral metal strip in the cylinder around the rod with the opposite ends of the strip bent at an angle and projecting into said slots to anchor the spiral, the convolutions of the spiral being in close proximity to one another whereby if the rod and cylinder are pulled axially away from each other by the weight of the falling man using the shock absorber the shock of the fall will be reduced by the friction of the relatively moving convolutions of said spiral as it is elongated axially.

4. A shock absorber in accordance with claim 1, in which said friction material is granular.

5. A shock absorber for a safety line having an anchored end and an end attached to a man, the shock absorber comprising a cylinder provided with an open end, a rod loosely disposed in the center of the cylinder and extending axially thereof out of said open end, means at the outer end of the rod and the opposite end of the cylinder for attachment to a safety line at points between its ends, and a spiral metal strip in the cylinder around the rod and having its outer end secured to the cylinder and its inner end secured to said rod, the convolutions of the spiral being in close proximity to one another, the rod and cylinder being movable axially away from each other by the weight of the falling man to elongate said spiral axially, and there being friction surfaces between the relatively moving convolutions of the elongating spiral to absorb force causing the elongation.

References Cited in the file of this patent

UNITED STATES PATENTS

| 1,641,217 | Yevseyeff | Sept. 6, 1927 |
| 2,459,545 | Schultz | Jan. 18, 1949 |

FOREIGN PATENTS

| 297,752 | Germany | May 12, 1917 |
| 10,214 | Great Britain | of 1909 |
| 580,255 | Great Britain | Sept. 2, 1946 |